Patented Oct. 3, 1933

1,929,044

UNITED STATES PATENT OFFICE 1,929,044

PROCESS OF VULCANIZING RUBBER COMPOUNDS

Theodor Weigel, Cologne-Mulheim, Germany, assignor to I. G. Farbenindustrie Aktiengesellschaft, Frankfort-on-the-Main, Germany No Drawing. Application September 24, 1930, Serial No. 484,234, and in Germany September 26, 1929

4 Claims. (Cl. 18—53)

The present invention relates to a process of vulcanizing rubber and consists in performing vulcanization after having incorporated within the products to be vulcanized a salt of a tricrotonylidene tetramine with an aliphatic saturated or unsaturated carboxylic acid containing more than ten carbon atoms. The invention, furthermore, relates to the new vulcanization accelerators used in the above named process.

In my co-pending application Serial No. 435,664, filed March 13, 1930, I have described among others a method of accelerating vulcanization processes by means of tricrotonylidene tetramines. In accordance with the present invention there are applied as accelerators instead of the free tricrotonylidene tetramines salts thereof with aliphatic saturated or unsaturated carboxylic acids containing more than ten carbon atoms, such as, for example, the salts with palmitic acid, stearic acid, lauric acid, margaric acid, oleic acid, elaidic acid, erucic acid, mixtures of such acids and the like. Also mixtures of these salts with the free tricrotonylidene tetramines, or mixtures containing free acids of the type above referred to may be applied. Considerable advantages over the use of the free tricrotonylidene tetramines are attained by my new process.

The free tricrotonylidene tetramines crystallize with water of crystallization (the tricrotonylidene-tetramine, melting at 97° C., with $6H_2O$, the isomer, melting at 77° C. with $4H_2O$), whereby dilution of the operative accelerating substance takes place. Dehydration of the products containing water of crystallization leads to difficulties on account of the tendency of the anhydrous substance to absorb water. Contrary thereto, the salts of the tricrotonylidene tetramines with acids above referred to can be readily produced in the anhydrous state the salts being much less hygroscopic and more efficacious than the free compounds containing water of crystallization. A further advantage of the salts consists in the fact that the so-called critical temperature is still further raised, that is to say the temperature at which incipient vulcanization occurs. Moreover, in consequence of the slight solubility of the free tricrotonylidene tetramines in the rubber compounds the vulcanization products in some cases show an undesirable mottled formation. When employing the above mentioned salts or their mixtures with higher fatty acids or free tricrotonylidene tetramines the solubility in the rubber compounds is improved and vulcanization products are obtained free from mottled effects. The manufacture of the salts referred to can be effected, for example, by simple melting together of the respective components.

It may be mentioned that the term "rubber" as used in this application is intended to include natural rubber and artificial rubber-like masses derived from rubber-forming hydrocarbons, such as butadien–(1.3) or its homologues or analogues.

The following examples will ilustrate the invention without restricting it thereto.

*Example 1.*—A mixture consisting of 100 parts by weight of smoked sheets, 5 parts by weight of sulfur, 5 parts by weight of zinc oxide and 1 part by weight of tricrotonylidene-tetramine (anhydrous, melting point 102° C.) is heated to 120° C. for 30 minutes. The vulcanization product displays a strength of 22 kgs. per sqcm. with an extensibility of 830%. When, however, instead of the free base 1,5 parts by weight of the stearate thereof are employed, then the same charge remains still completely unvulcanized even after heating for 60 minutes to 120° C. These tests clearly prove the good critical temperature of the tricrotonylidene salt applied.

*Example 2.*—A mixture consisting of 100 parts by weight of smoked sheets, 5 parts by weight of sulfur, 5 parts by weight of zinc oxide and 2 parts by weight of the stearate of tricrotonylidene-tetramine (melting point 102° C.) is heated to 142° C. for 20 minutes. The vulcanization product displays a strength of 180 kgs. per sqcm. with an extensibility of 791%, while the vulcanization product from the same mixture with 1 part by weight of the free tricrotonylidene-tetramine yields the inferior values of 150 kgs. per sqcm. with an extensibility of 796%. In the following claims the term "tricrotonylidene tetramine" is intended to include the two isomers referred to above which isomers may be in the crystallized or in the anhydrous form.

I claim:—

1. In the process of vulcanizing rubber the step which comprises adding to the rubber a salt of tricrotonylidene tetramine with an aliphatic carboxylic acid containing more than ten carbon atoms.

2. In the process of vulcanizing rubber the step which comprises adding to the rubber a salt of tricrotonylidene tetramine with an aliphatic carboxylic acid of the formula $C_nH_{2n}O_2$, wherein $n$ means one of the numbers 16 and 18.

3. Vulcanization accelerators comprising a salt of tricrotonylidene tetramine with an aliphatic carboxylic acid containing more than ten carbon atoms.

4. Vulcanization accelerators comprising a salt of tricrotonylidene tetramine with an aliphatic boxylic acid of the formula $C_nH_{2n}O_2$, wherein $n$ means one of the numbers 16 and 18.

THEODOR WEIGEL.